United States Patent [19]
Todd

[11] Patent Number: 5,072,442
[45] Date of Patent: Dec. 10, 1991

[54] MULTIPLE CLOCK RATE TELECONFERENCING NETWORK

[75] Inventor: Sidney P. Todd, Alexandria, Va.

[73] Assignee: Harris Corporation, Melbourne, Fla.

[21] Appl. No.: 487,075

[22] Filed: Feb. 28, 1990

[51] Int. Cl.$^5$ .................. H04Q 11/04; H04J 3/22; H04M 3/56

[52] U.S. Cl. ........................... 370/62; 370/84; 370/85.1; 370/110.1; 379/202; 358/85

[58] Field of Search ............. 370/62, 84, 79, 94.3, 370/58.1, 58.2, 58.3, 60, 60.1, 61, 66, 80, 85.1, 85.9, 85.13, 94.1, 95.3, 104.1, 110.1; 379/202, 53, 54, 201, 243, 258, 268; 358/85

[56] References Cited

U.S. PATENT DOCUMENTS

| | | | |
|---|---|---|---|
| 4,479,195 | 10/1984 | Herr et al. | 379/202 |
| 4,589,107 | 5/1986 | Middleton et al. | 370/58.1 |
| 4,748,618 | 5/1988 | Brown et al. | 370/62 |
| 4,847,829 | 7/1989 | Tomplins et al. | 370/62 |

Primary Examiner—Douglas W. Olms
Assistant Examiner—Alpus H. Hsu
Attorney, Agent, or Firm—Evenson, Wands, Edwards, Lenahan & McKeown

[57] ABSTRACT

A hub-resident data switching apparatus for a multinode teleconferencing network enables plural node sites, operating at differing clock rates, to communicate with each other asynchronously and simultaneously. The switching apparatus includes an internal TDM bus to which plural node interface units, an audio combiner unit and a timing and control unit are coupled. Each node interface unit is associated with a respective node and is operative to receive and forward communication signals with respect to its node at the clock rate of the service used by that node. The hub's TDM bus includes a video/PC file bus and an audio/command bus and operates at a clock rate that is a multiple of the number of nodes in the network times the highest clock frequency of any node in the network divided by the bit width of the TDM bus. Each unit interfaces with the TDM bus by way of a pipeline bus interface unit. The audio combiner unit outputs digitized 'combined audio' signal packets onto the audio bus for transmission to its associated node. The output section of the audio combiner unit includes an audio packet input buffer whose contents are processed in dependence upon the occupancy status of each audio packet input buffer in the combiner. As long as there is sufficient audio data stored in one or more buffers to ensure effectively continuous audio processing, audio data is processed and forwarded for transmission. If the audio packet input buffers have very little or no audio data, then processing is delayed.

35 Claims, 6 Drawing Sheets

ADDRESS 0-7 = NODE 0-7
       8-16 = FUTURE EXPANSION (NODES 8-15)

ADDRESS 0-7 = NODE 0-7 AUDIO/COMMANDS
              FROM NODES

ADDRESS 8-15 = FUTURE EXPANSION
               (NODES 8-15)

ADDRESS 16-23 = NODE 0-7 COMBINED AUDIO
                TO NODES

ADDRESS 24-31 = FUTURE EXPANSION
                (NODES 8-15)

ADDRESS 32 = COMMAND DATA TO NODES

MULTIPLE CLOCK RATE TELECONFERENCING NETWORK

FIELD OF THE INVENTION

The present invention relates in general to telecommunication systems, and is particularly directed to a star-configured teleconferencing network having a hub site that is capable of enabling multiple nodes, which operate at respectively different clock rates, to effect simultaneous communications with one another.

BACKGROUND OF THE INVENTION

Continuing advances by the communications industry in developing new equipment has spawned a variety of networking services that integrate multiple types of information signals (e.g. the simultaneous exchange of audio, video and data (e.g. PC file and command data) in teleconferencing networks) into a shared, multi-site system through which a customer may send and receive information to any other subscriber of a particular service. Unfortunately, because the hardware and communication characteristics (e.g. types of architecture, such as fiber-optic, satellite, copper links, signaling rates, protocols, etc.) of the services are typically different from one another, it is not usually been possible to interconnect different network architectures, so as to permit simultaneous transmission and reception of information among plural sites of different networks.

A principal impediment to simultaneous communications among multiple subscribers of different network architectures is the fact that each system operates at a different clock rate, so that data cannot be readily passed from one node to another. Because of this limitation, subscribers may be faced with the costly and operator intensive task of installing multiple types of equipment associated with different carriers, in order to realize geographically dispersed communication coverage. Even where the available network coverage is reasonably widespread, all nodes of the system are required to operate with the same clock (provided by the carrier). Not only does such a synchronous system limit user flexibility in choice of equipment, but, should the master clock die, the entire network goes down.

SUMMARY OF THE INVENTION

In accordance with the present invention, the above-described drawbacks of conventional multinode communication networks are obviated by a new and improved communication switching apparatus, to be installed at a hub site, which enables plural node sites, which operate at differing clock rates, to communicate with each other assynchronously and simultaneously. For this purpose, the hub-resident communication switching apparatus of the present invention includes an internal, time division multiplexed (TDM) communication pipeline bus to which a plurality of node interface units are coupled, each node interface unit being associated with a respective one of the nodes of the network and being operative to receive and forward communication signals with respect to that associated node at the clock rate of the service used by that node.

The (TDM) communication pipeline bus within the hub site includes a video/PC file data bus and an audio/command data bus and operates at a clock rate that is a multiple of the number of nodes in the network times the highest clock frequency of any node in the network. The interface unit includes a video/PC file input section which is coupled to place incoming digitized video/PC file signal packets onto the video/PC file data bus during its dedicated one of a plurality of video/PC file data bus time slots, and an audio/command data input section which is coupled to place digitized audio/command data packets onto the audio/command data bus during its dedicated one of a plurality of audio/command data bus time slots. Each interface unit also includes a video/PC file data output section which is coupled to extract video/PC file data packets from any time slot on the video/PC file data bus, and an audio output section which is coupled to extract digitized 'combined audio' signal packets from any time slot on the audio/command data bus for transmission to its associated node. By 'combined audio' is meant signals that have been received from plural nodes other than that associated node and are to be combined for transmission to that associated node.

The audio output section includes an audio packet input buffer which stores digitized audio data packets that have been received from its associated node. The contents of the audio input buffer are controllably coupled to a format conversion, combining section, which controllably converts the contents of the buffer to analog format and couples the analog audio to the audio output section of each of the other interface units. This section also combines analog audio signals that have been received from the other interface units and converts the combined analog audio into digital format, for transmission as a 'combined audio' packet to its associated node. The controllable coupling of the contents of the audio packet input buffer to the format conversion, combining section is governed by the occupancy status of each audio packet input buffer.

In particular, as long as there is sufficient audio data stored in at least one audio channel input buffer so as to ensure effectively continuous audio processing, audio data is processed and forwarded for transmission. If the audio packet input buffers have very little or no audio data, then processing is delayed. In accordance with the audio signal processing mechanism of the present invention, if any input buffer of an active channel becomes empty, capacity usage (HALF-FULL) flags from input buffers of all audio channels are examined to determine if any input buffer is at least half-full. Unless there is at least one input buffer that it is at least half-full, then processing of audio signals is interrupted. Namely, the audio signal processing section of each channel is inhibited until at least one audio input buffer becomes at least half full or all input buffers contain data. If at least one channel has an empty buffer and the input buffer of at least one other channel is at least half-full, then the channel or channels having a half-full buffer process one byte of audio data.

DETAILED DESCRIPTION

Figure 1:
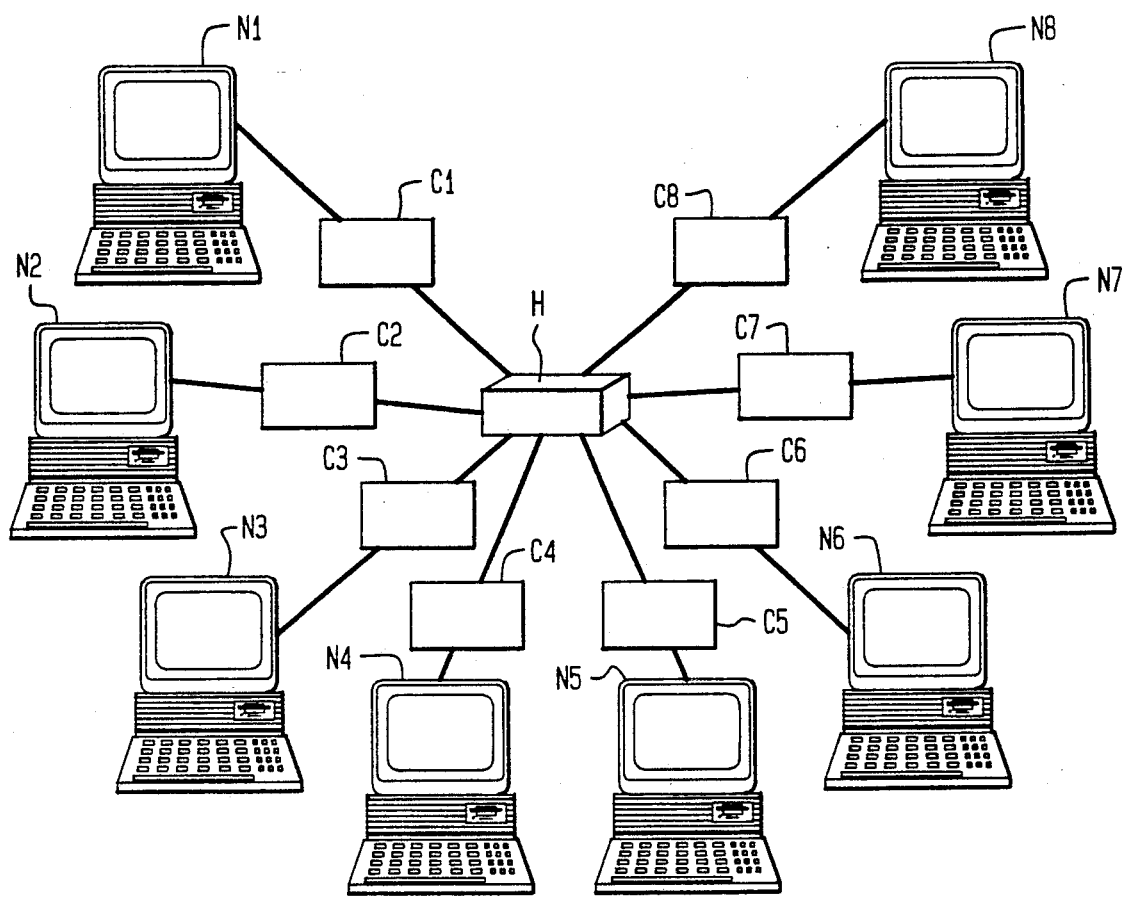
FIG. 1 diagrammatically illustrates a star-configured multinode telecommunications network.

Before describing in detail the particular improved multiple signaling rate teleconferencing network in accordance with the present invention, it should be observed that the present invention resides primarily in a novel structural combination of conventional communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Referring now to FIG. 1, a star-configured multinode telecommunications network is diagrammatically shown as comprising a plurality of N=8 nodes N1-N8 which are linked with a hub H via respective standard communication equipments C1-C8. For purposes of a practical illustration of the network, the nodes may be geographically dispersed throughout the continental United States in the manner shown in FIG. 2, which shows node N8 (Chicago) being local to hub H. It should also be observed that the number of nodes is not limited to eight, which has been chosen merely for purposes of example. Equipments C1-C8 may comprise any currently available digital transmission facilities, such as T-1, fractional T-1, switched 56 Kb/s lines and dedicated lines of an existing circuit, providing commonly used signaling (e.g. RS 422/449) compatibility and operating at different clock rates (e.g. from 56 Kb/s to 1.544 Mb/s).

Thus, for example, the Chicago node (N8) which is local to hub H may be connected to the hub by wire or a fiber optic link. Seattle, Miami and Washington nodes N6, N3 and N2, respectively, may lease fractional T-1 service from an RBOC, while respective Los Angeles, Dallas and New York nodes N5, N4 and N1 may be coupled with existing dedicated circuits to Chicago with sufficient bandwidth to accommodate the nodes. Node N7 (St. Louis) may have dial up capability for four switched 56 Kb/s lines for a total bandwidth of 224 Kb/s, using mux/demux devices at each end of the link.

Figure 2:
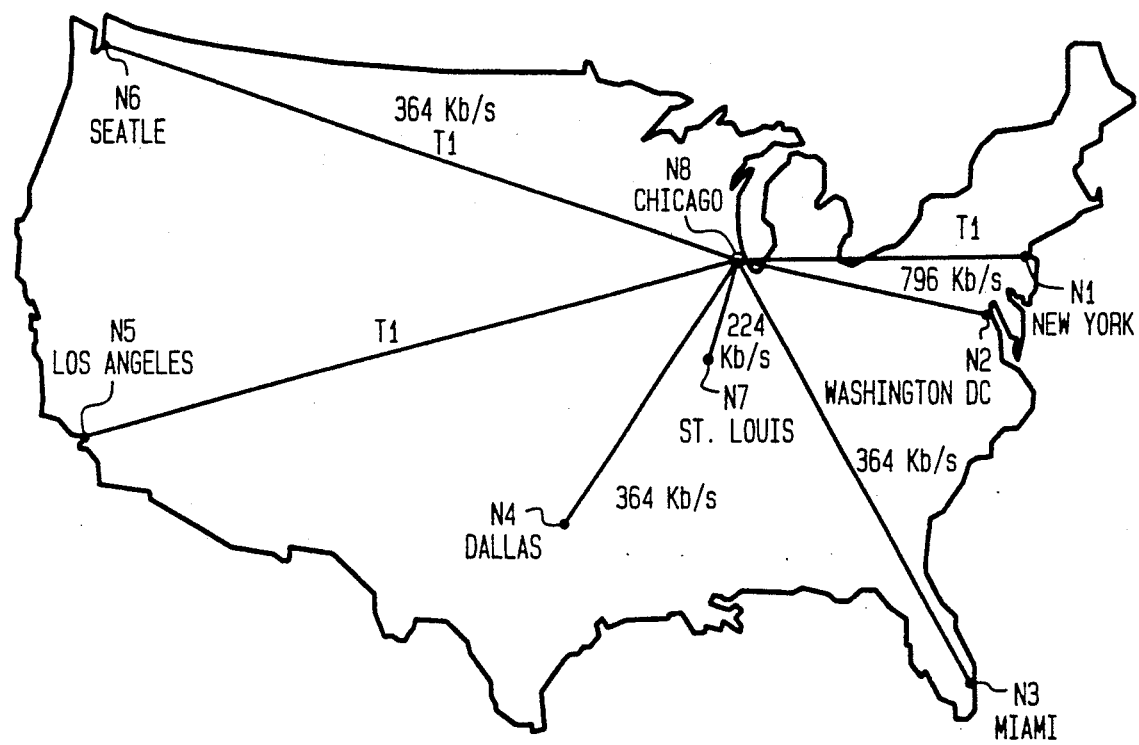
FIG. 2 shows a star-configured communication network having nodes geographically dispersed throughout the continental United States.

In the exemplary network architecture of FIGS. 1 and 2, the different nodes of the network operate at different clock rates. As noted previously, this has been a major obstacle to simultaneous communications among multiple subscribers that are serviced at the respective nodes. With the increased demand for multiple data exchange, the inability to interface diverse systems has prevented the successful proliferation of teleconferencing services, which require simultaneous video, audio and data transmission and reception capability. Pursuant to the present invention, this problem is solved by means of novel communication switching apparatus, which is installed at the hub H and enables each of node sites N1-N8 to communicate with each other assynchronously and simultaneously, even though the respective services to which they are connected operate at different clock rates.

Figure 3:
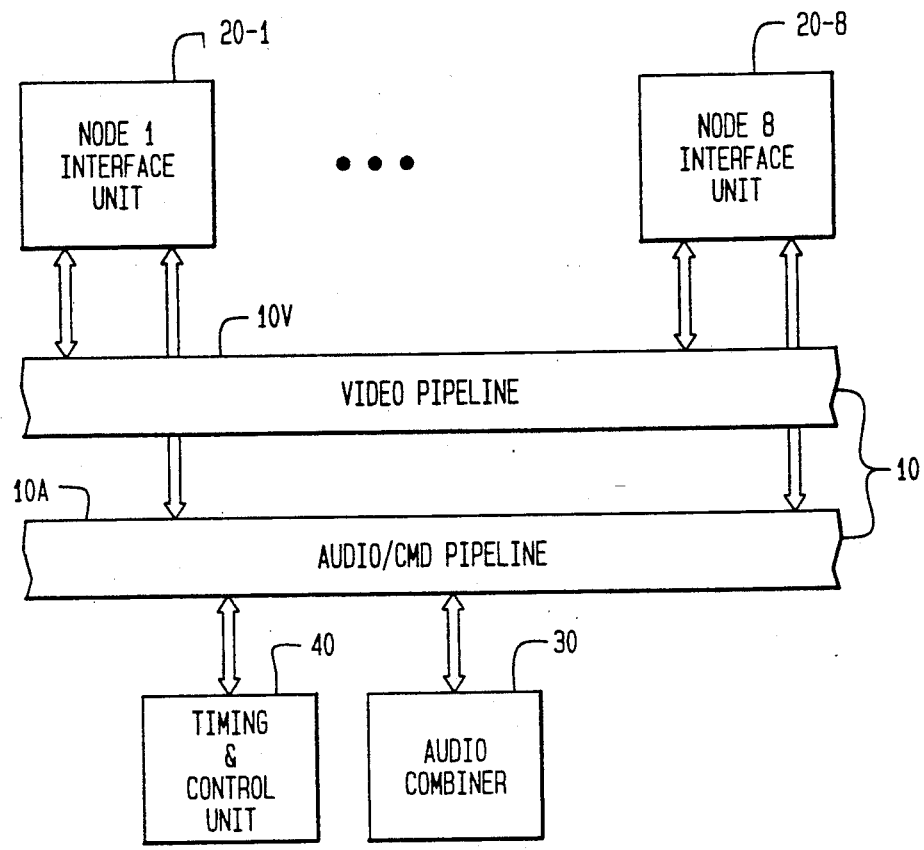
FIG. 3 diagrammatically illustrates a block diagram of a hub-resident communication switching apparatus in accordance with the present invention.
Figure 3A:
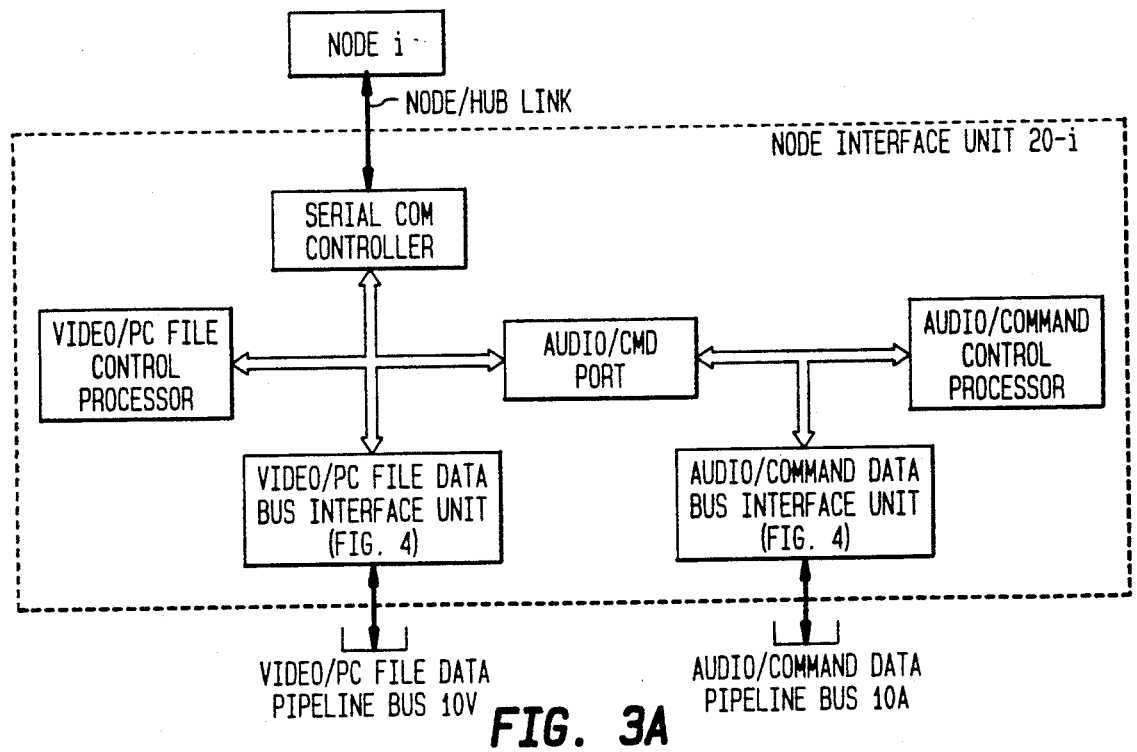
FIG. 3A is a block diagram of the configuration of a node interface unit

More specifically, FIG. 3 diagrammatically illustrates a block diagram of a hub-resident communication switching apparatus in accordance with the present invention, which includes a time division multiplexed (TDM) communication pipeline bus 10, containing a video/PC file data portion, denoted as video/PC file data pipeline bus 10V, and an audio/command portion, denoted as audio/command data pipeline bus 10A, each of which has address, data and control/status lines of prescribed code widths, to which a plurality of node interface units 20 (an individual one of which is shown in FIG. 3A, to be described below) are coupled. In the present example, there are eight node interface units 20-1-20-8, respectively associated with nodes N1-N8 of the network shown in FIGS. 1 and 2, each of which is operative to receive and forward communication signals with respect to its associated node at the clock rate of the service used by that nodes. Thus, for example, node interface unit 20-1 is coupled with the T-1 communication equipment servicing New York node N1 at 56 Kb/s.

Each of the video/PC file data pipeline bus 10V and the audio/command data pipeline bus 10A operates at a clock rate that is considerably higher than the highest clock frequency employed by any node in the network, so as to ensure that no data that has been transmitted from any node in the network will be lost. For this purpose, the clock frequency of video/PC file data pipeline bus 10 is a multiple of (e.g. twice) the number of timeslots (associated with the respective nodes of the network) times the highest clock frequency of any node in the network, divided by the width (in bits) of the bus. Thus, for the above exemplary range of 56 KHz-1.544 MHZ, and allowing for sixteen timeslots (to permit reasonable expansion from the eight nodes of the example) the video/PC file data pipeline bus clock rate may be set at $2 \times 16 \times 1.544$ MHz/8 = 6.176 MHz.

In the case of outgoing data returned to the nodes of the network, each node interface unit operates at a data rate no greater than the lowest clock rate of any node in the network. As a result, any node receiving data from the hub will not miss any data from another node.

As diagrammatically illustrated in FIG. 3A, a respective node interface unit 20-i includes a serial communications controller (SCC) 21, (e.g. commercially available from Zilog or Advanced Micro Devices) which is coupled via the hub/node communications link to a codec within node site Ni. Preferably, the codec is one capable of handling up to four channels of video data simultaneously and may comprise a personal computer-driven Model Image 30 codec, manufactured by Concept Communications, which interfaces with the node/hub communications link. As the details of such codec and the communications mechanism between the hub and the nodes are conventional and unnecessary for an understanding of the present invention, they will not be described here.

Within the node interface unit 20-i, SCC 21 is coupled by way of an internal processor communications bus 22 to a video/PC file data control processor 23, which controls the operation of SCC 21 and parses communication signals into respective components for processing within the hub site. Video/PC file data, for example, is coupled over bus 22 to one or more (e.g. up to four) video/PC file data bus interface units 24V, through which video and PC file data are interfaced with a video/PC file data portion 10V of the hub's TDM communications bus 10. Processor bus 22 is also coupled via an audio/command port 25 to an audio/command processor bus 26, to which an audio/command processor 27 is coupled. Audio/command processor 27 processes audio and command data (parsed by processor 23) and couples audio/command data to an audio/command bus interface unit 24A. Like video/PC file data bus interface unit 24V, audio/command data bus interface unit 24A interfaces audio and command data with the audio/command data portion 10A of the communications bus 10. The details of an individual (video/PC file data, audio/command) bus interface unit will be described below with reference to FIG. 4.

As described above, a respective interface unit 20-i contains an audio/command pipeline bus interface unit for interfacing audio/command signals with audio/command pipeline bus 10A and up to four video/PC file pipeline bus interface units for interfacing up to four channels of video data between the hub/node communications link and video/PC file data pipeline bus 10V. The incorporation of up to four pipeline bus interface units in a single node interface unit permits the hub to take advantage of the capability of the above-referenced manufacturer's codec to process up to four video channels simultaneously. Taking advantage of this feature allows the present invention to offer a significantly improved teleconferencing capability. In such a multichannel configuration, each node interface unit may receive (up to four) different video/PC file timeslot data from (up to four) different nodes simultaneously. This data may then be combined by control firmware and forwarded to the associated node for simultaneous display of four different video channels on the same (multi-split screen) video display at the same time. (Because each node sources only a single video channel, its associated node interface unit will contain one full duplex-configured (transmit and receive) video/PC file data pipeline bus interface unit and three half duplex-configured (receive only) video/PC file data pipeline bus interface unit.) Which timeslot data is processed is set by incoming commands from the nodes, decoded and routed to the designated receiver circuit for timeslot selection.

Each pipeline bus interface has an input section, which is coupled to place incoming digitized signal packets onto its associated pipeline bus during an assigned one of a plurality of pipeline bus time slots, and an output section which is coupled to extract signal packets from a timeslot on its associated pipeline bus.

Also coupled to the audio/command pipeline bus portion 10A of bus 10 are an audio combiner unit 30, to be described below with reference to FIG. 8, which captures audio packets and controllably combines audio signals from multiple nodes to produce 'combined audio' packets that are written onto audio/command pipeline bus 10A for transmission to requesting nodes, and a timing and control unit 40, which interfaces command packets with pipeline bus 10A, for timing and control purposes. Timing for the video/PC file data pipeline bus 10V and audio/command data bus 10A is generated by timing and control unit 40 using standard counters and PROMs which are programmed in accordance with user timing requirements. Control unit 40 contains a microprocessor and associated memory which receive commands from each node and broadcast commands to all nodes. The commands may be used for the selection of each node's receive timeslot and for control during broadcast of PC file transfers. A configuration command for a node is sent to the timing and control unit, which then sends the command to all node interface units. Timing and control unit 40 also captures and distributes incoming commands among the units of the hub for controlling node participation. As the details of the commands and timing, per se, depend upon the choice of service and operational parameters, and are unnecessary for an understanding of the present invention, they will not be described in detail here. Instead, for reference purposes, a code listing of the control software is contained in an accompanying appendix. Like node interface units 20, each of audio combiner unit 30 and timing and control unit 40 includes a pipeline bus interface unit for interfacing audio and command signals with audio/command pipeline bus 10A.

Figure 4:
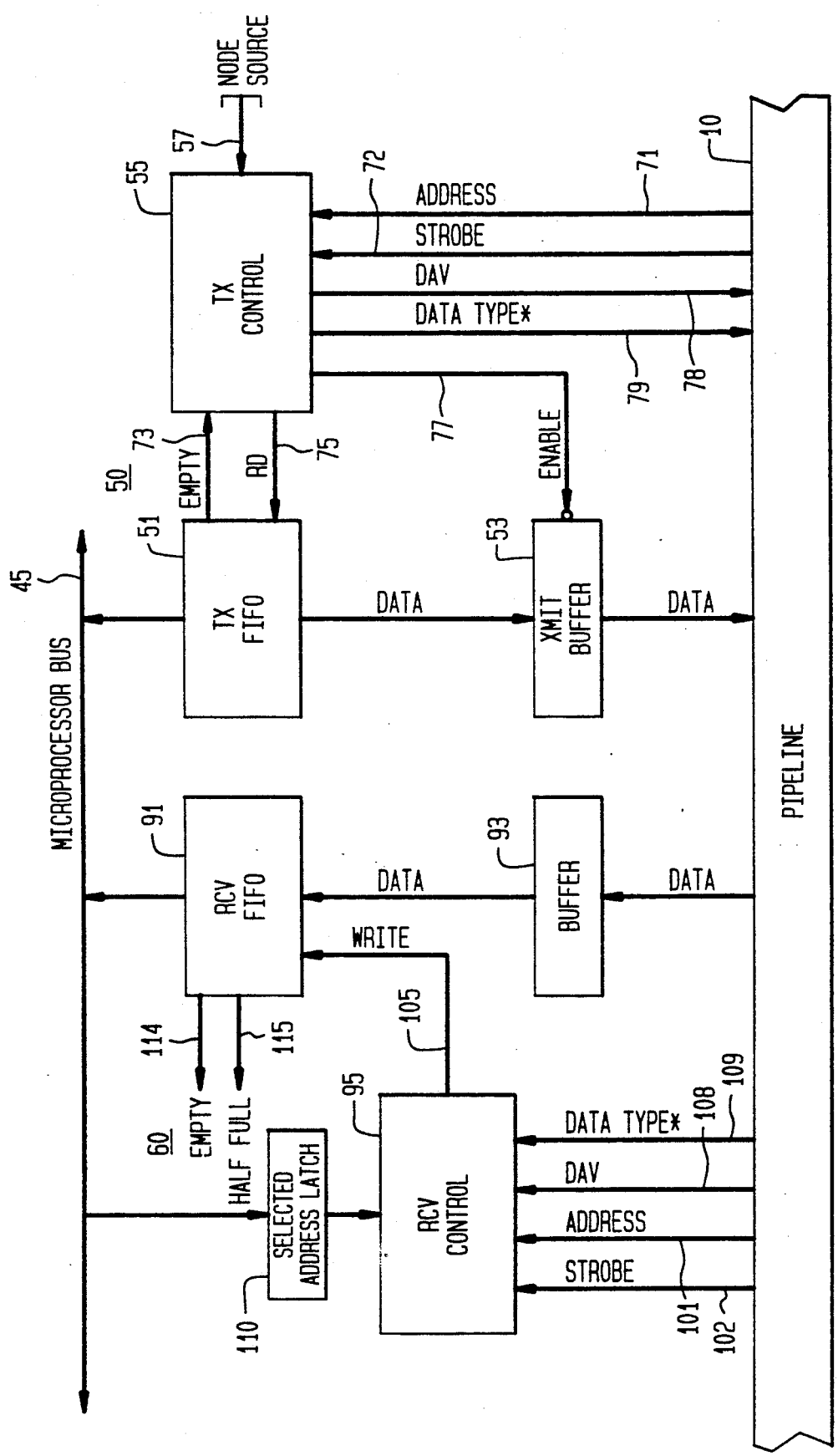
FIG. 4 diagrammatically illustrates the configuration of pipeline bus interface unit.

Referring now to FIG. 4, the configuration of a pipeline bus interface unit, through which a respective pipeline bus (10A or 10V) is interfaced with associated signal processing circuitry in one of the node interface units 20, audio combiner unit 30, or timing and control unit 40, is shown as comprising an input section 50 and an output section 60. Input section 50 controllably couples signals from associated signal processing circuitry to (one of pipeline bus portions 10A and 10V of) bus 10, while output section controllably couples signals from bus 10 to associated signal processing circuitry. For example, within a respective node interface unit 20, video/PC file data may be coupled to input section 50 from an associated processor bus, whereas, within audio combiner unit 30, audio signals are 'combined audio' supplied from associated audio signal combining circuitry.

Input section 50 contains an first-in, first-out (FIFO) store 51, which is coupled to receive and store incoming data packets (e.g. within a node interface unit 20, video/PC file data which have been received by a serial communication controller from the node/hub and parsed by the node interface unit control processor 23 (FIG. 3A). FIFO store 51 is coupled, in turn, to a buffer 53, through which data in the FIFO is selectively placed on an associated pipeline bus during a prescribed one of a plurality of timeslots, under the control of a transmit, or bus input, control unit 55. Transmit control unit 55 is preferably comprised of programmable array logic, which executes a prescribed control mechanism based upon predetermined signal parameters (to be discussed below for the different signal types (e.g. audio vs. video)) and supplies control signals for the transfer of blocks (successive bytes) of input data to pipeline bus 10 during a timeslot defined by a local address input 57 associated with the address of a respective network node.

Under the control of a TDM framing/timing sequence that governs the operation of TDM communications pipeline bus 10, successive address (timeslot) codes are placed on the address portion of bus 10, so that, via address segment 71, transmit control unit 55 may be advised during which of the time slots (i.e. whose address matches the code on address input 57), it is permitted to place data that has been stored in FIFO store 51 on the bus. For this purpose, transmit control unit 55 is coupled to read an EMPTY flag line 73 from FIFO store 51, to determine whether or not the FIFO has data to be placed on the bus. Whenever FIFO store 51 has data (i.e. it is not empty), it places a prescribed logic level on EMPTY flag line 73. In response to this signal, transmit control unit 55 supplies a read signal over line 75, so that a byte of data is read from the FIFO 51 into a transmit buffer 53. At the beginning of the time slot defined by address input 57, buffer 53 is controllably enabled, so as to place data on the bus via an enable signal supplied from controller unit 55 over line 77. At the same time, a data available signal DAV is asserted onto the bus via a line 78, so as to indicate to each interface unit that is connected to the bus that data has been placed on the bus within this timeslot.

Where the pipeline bus interface unit within a node interface unit is used to interface audio/command signals with bus 10A, its transmit control unit 55 also has a data type (DT) line 79, which is used to indicate whether the data is audio data (intended for audio combiner unit 30) or command data (intended for timing and control unit 40).

Once a byte of data has been coupled from FIFO 51 through buffer 53 onto the bus, it remains asserted on the bus for a prescribed period of time within the time slot, as governed by a strobe pulse, which is coupled via line 72 from the bus.

Figure 5:
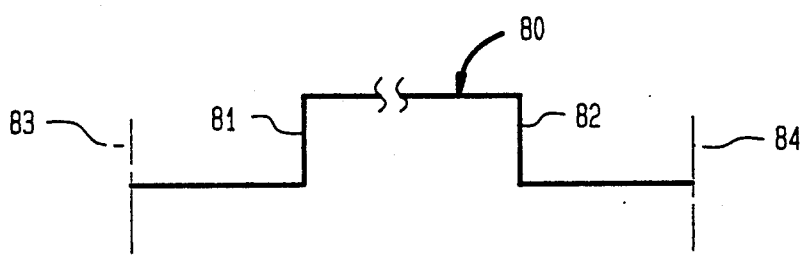
FIG. 5 shows a strobe pulse.

More particularly, with attention directed to FIG. 5, an individual strobe pulse 80 is shown as having a leading edge 81 and a trailing edge 82, and a width W equal to half the duration of a timeslot Ti and being centered within the timeslot, so that its leading edge 81 is delayed from the beginning 83 of the timeslot by one-fourth the duration of the timeslot and the trailing edge 82 occurs at a point in time one-fourth the duration of the timeslot prior to the end 84 of the timeslot. As pointed out above, if FIFO store 51 has data to be asserted onto the bus, then, coincident with the beginning of a timeslot, transmit control unit 55 will place a prescribed logic level on line 78 (i.e. assert data available (DAV)). DAV remains asserted for a prescribed period of time subsequent to the end of strobe 80, but prior to the end of the timeslot, in order to allow the output, or receive, section of the bus interface unit sufficient time to load data off the bus. In accordance with an exemplary embodiment, data available (DAV) line 78 may remain asserted for two high speed clock (e.g. 32 MHz) periods subsequent to the trailing edge of strobe 80. As will be described below, the rising and falling edges of strobe pulse 80 govern the operational timing of data capture by the output section.

Referring again to FIG. 4, output section 60 includes a receive buffer 93, which is coupled to buffer data that has been asserted onto the bus to an output FIFO store 91 under the control of a receive, or output, control unit 95. Like transmit control unit 55, receive control unit 95 is comprised of combinational logic (preferably implemented in programmable array logic), for controlling the operation of output section 60, specifically the controlled capturing of data that has been asserted onto the bus. For this purpose, receive control unit has an address segment 101 coupled to the address portion of bus 10, the contents of which are compared with an address code that is supplied via link 110 (e.g. from a programmable address latch) from the attendant device with which the bus interface unit is coupled, for defining during which timeslot (from which node) data, if present, is to be captured. Receive control unit 95 is also coupled to strobe line 102, which is coupled to receive the strobe signal 80, a data available line input control line 108 to which the DAV signal is coupled and, if part of the audio/command interface unit of a node interface unit, a data type control line 109 to which a data type (DT) signal is coupled. Receive control unit 95 has a FIFO write control line 105 coupled to output FIFO store 91, which is asserted when data is to be captured from the bus, and a buffer enable line 107, which is asserted coincident with leading edge of the strobe pulse, if the timeslot address matches that supplied over link 110.

Specifically, in order for data that has been asserted onto the bus to be captured by output section 60, three events are necessary. First, the contents of address latch 110 must match the address on link 101. Secondly, the data available signal DAV must have been asserted prior to the leading edge of strobe pulse 80. When this occurs, control unit 95 enables buffer 93 via link 107, so as to permit the data capture circuitry to settle before data is actually taken from the bus. The last event necessary is the occurrence of the trailing edge of strobe, at which time line 105 is enabled the data is written into the FIFO store 91. If no data has been asserted onto the bus during the timeslot, then the data available signal DAV would not have been asserted and output control unit 95 will not enable either of buffer 93 or FIFO 91 in response to strobe pulse 80. As noted previously, data remains asserted on the bus for two high speed clock cycles after the trailing edge of strobe, which provides a sufficient margin to complete data capture.

FIFO store 91 has a pair of (occupancy) status lines, specifically an EMPTY flag line 114 and a HALF-FULL flag line 115, which are readable by associated signal processing circuitry, such as audio combiner unit 30 in the case of audio signals, as will be described below, for indicating whether the receive FIFO store 91 is empty and, if not, whether it is at least half-full, respectively. For example, as will be described below with reference to the audio combiner circuitry of FIG. 8, the controlled combining of audio signals from multiple nodes is executed in accordance with the occupancy, or 'fullness', of the audio data storage FIFO, so as to maintain an effectively continuous stream of combined audio signals output to the respective nodes participating in a teleconference transmission.

Figure 6:
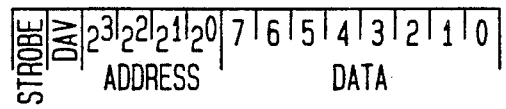
FIG. 6 shows the code configuration of a video/PC file pipeline bus.

The code configuration of video/PC file pipeline bus 10V is shown in FIG. 6 as comprising an eight bit data field DATA, a four bit address field ADDRESS, a data available bit DAV and a strobe line STROBE. For the present example of an eight node network there are eight used addresses. Providing an additional eight addresses for expansion yields a total of sixteen addresses, or a four bit address segment.

Figure 7:
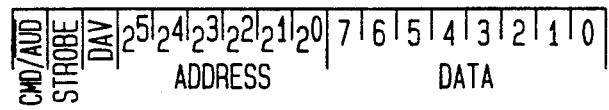
FIG. 7 shows the code configuration of an audio/command pipeline bus.

Similarly, as shown in FIG. 7, the code configuration of audio/command pipeline bus 10A comprises an eight bit data field DATA, a five bit address field ADDRESS, a data available bit DAV, a command/audio bit DT, and a strobe line STROBE. Again, in the present example, since the network contains eight nodes, so that there are sixteen used addresses (for incoming audio/command signals 'from' eight source nodes and outgoing combined audio signals 'to' eight destination nodes), and with an additional sixteen addresses provided for expansion, there is a total of thirty-three addresses. The thirty-third address (address 32) is for command data from timing and control unit 40 broadcast to all node interface units 20.

Figure 8:
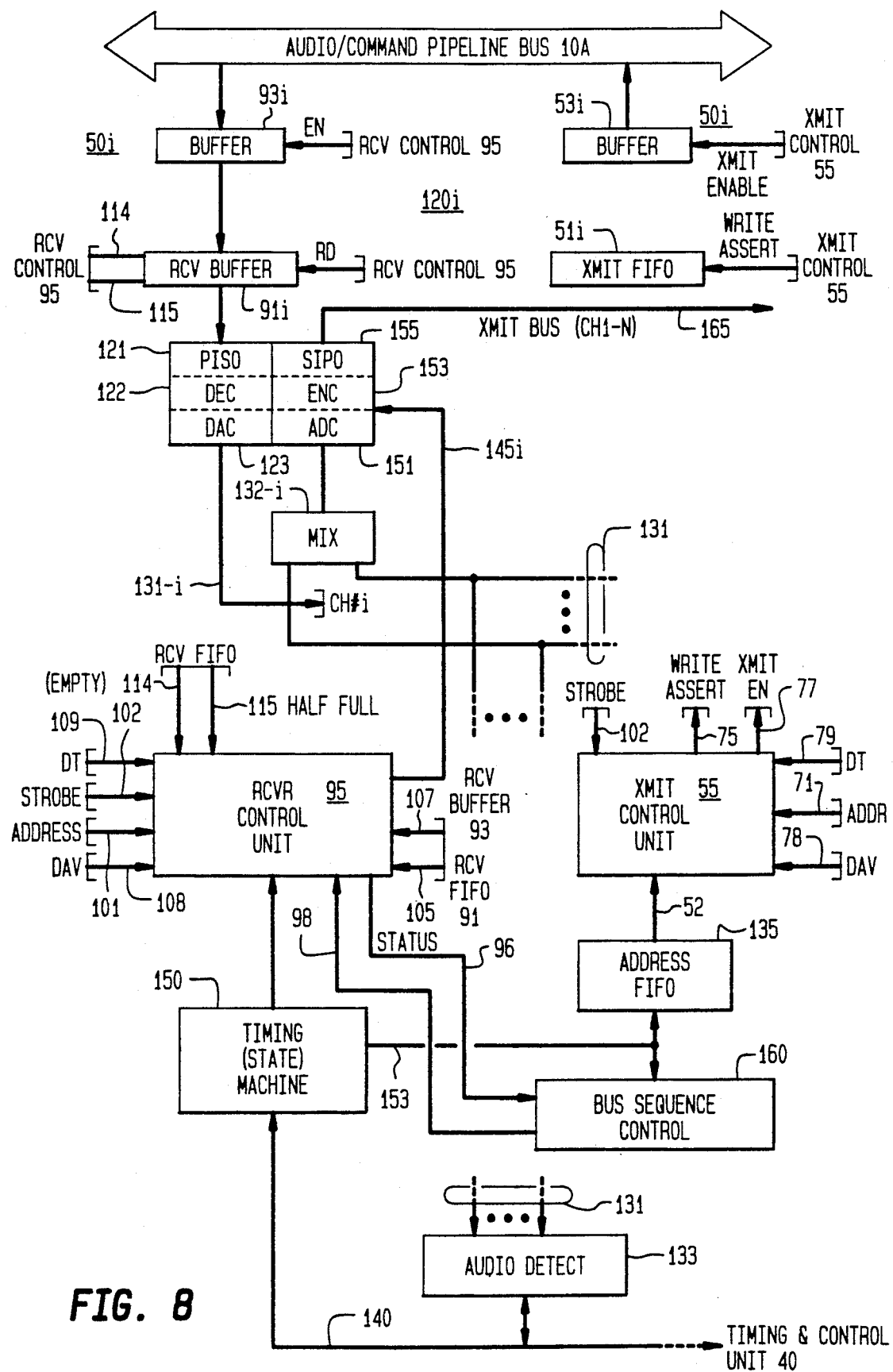
FIG. 8 shows the configuration of an audio combiner unit.

Referring now to FIG. 8, the configuration of an audio combiner unit 30 is diagrammatically shown as comprising a plurality of (N=8 in the present example) audio channel units 120-1–120-8, a respective one 120-i of which contains a pipeline bus interface unit having a configuration, as generally depicted in FIG. 4 (for an output section 60), but modified to provide 'combined audio' from plural nodes and to control the processing of audio based upon the 'occupancy' of the receive or output FIFO stores. Each audio channel unit 120-i contains a transmit or input section 50 having an input or transmit FIFO store 51 which is coupled to receive 'combined audio' data from a multiline audio transmission bus 165. By 'combined audio' is meant audio signals that have been received from other nodes and which are to be combined for transmission to that associated node. As in the configuration shown in FIG. 4, the output of FIFO store 51 is coupled through a transmit buffer 53 to audio/command pipeline bus 10A. Respective write and enable signals are coupled over lines 75 and 77 to FIFO store 51 and buffer 53 from a transmit control unit 55.

Audio transmission bus 165 is coupled to receive digitized audio signal bytes that are the result of a summation of the audio from respective groups of (N-1=7) nodes. A 'combined audio' data byte to be output onto the bus 10A is formed by combining the audio from each node absent the node to whom the combined audio is being returned. For example, the combined audio to be returned to node 1 is the sum of the audio from each of nodes 2–8, while the combined audio to be returned to node 2 is the sum of the audio from each of nodes 1 and 3–8.

The output section 60 of channel unit 120-i also includes a receive buffer 93, which is coupled via an output FIFO store 91 to a controlled audio processing section 128. Audio processing section 128 controllably converts received bytes of audio data (such as 32 KHz ADPCM data) into analog format, combines analog audio from plural channels and then reconverts the combined audio into digital data for transmission. Decode processing of a byte of input audio data and encode processing of a byte of output 'combined audio' data are performed simultaneously with audio processing section 128.

For this purpose, audio processing section 128 comprises a parallel-in, serial-out (PISO) register 121, which is coupled to FIFO store 91 and the output of which is coupled to decoder 122. Decoder 122 decodes the audio input data and couples the decoded audio data to an analog-to-digital converter (ADC) 123, the output of which is an analog audio signal. Each channel's analog audio signal is coupled over a respective line 131-i of a multichannel bus 131 to a set of (N-1) audio combiner networks (e.g. passive resistor combiners) 132 associated with the other channels of the network (i.e. all channels but itself). Thus, for channel i, its associated audio combining network 132-i will be coupled to combine the analog audio signals from all channels, save channel i. Letting channel i=1, then its associated combining network 132-1 will receive and combine analog audio signals from channels 2–8.

The combined analog audio signal produced by audio combining network 132-i is coupled to a digital-to-analog converter (DAC) 151, which converts the combined analog audio signal into digital format. The output of DAC 151 is then (ADPCM) encoded in encoder 153, the output of which is coupled to serial-to-parallel register (SIPO) 155, to provide a byte of 'combined audio' data for application to combined audio transmission bus 165, referenced above. As will be described in detail below, the operation of audio signal processing unit 128 is controlled by receive control unit 95 in accordance with the contents of audio/command pipeline bus 10A (as described above with reference to FIG. 4) and in dependence upon the occupancy or 'fullness' of the receive FIFO stores 91 of each channel.

The timing of events within the audio combiner unit 30 is controlled by a state machine 150 and under supervisory control of the timing and control unit 40, which is coupled to receiver intra unit timing and control bus 140. State machine 150 preferably comprises a counter, which is incremented by a fixed clock source (e.g. a 32 KHz clock associated with the ADPCM formatting of the audio data) and addresses a set of timing programmable read only memories (PROMs), outputs of which are coupled over link 151 to receive control unit 95, and over link 153 to an address FIFO store 135 and to a bus sequence control unit 160, associated with the generation of timeslot addresses for designating which 'combined audio' data goes to which node. Like transmit and receive control units, bus sequence control unit 160 is preferably comprised of (PAL-implemented) combinational logic for providing timing/control signals over link 98 to receive control unit 95 for controlling the operation of audio signal processing section 128. The contents of address FIFO store 135 represent which combined audio data (i.e. from which respective group of seven nodes other than the channel whose address is stored in FIFO 135) is to be asserted onto the pipeline bus 10A. The contents of FIFO store 135 are coupled over link 52 to transmit control unit 55.

As described above in conjunction with the description of a pipeline interface unit shown in FIG. 4, when the contents of address input 52 (here, the contents of address FIFO store 135) match the timeslot address on the pipeline bus, and assuming that transmit FIFO 51-i has data to be sent, then transmit control unit 55 asserts DAV over link 71 and enables transmit FIFO store 51-i and buffer 53-i, via links 75-i and 77-i, respectively.

Audio combiner unit 30 also contains an audio detection unit 133 (e.g. a set of threshold comparators), which is coupled to the audio analog line 131 from each channel, for determining when the level of line 131 exceeds a prescribed value and therefore indicates that useful audio (e.g. voice) is present. Audio detection unit is monitored via bus 140 by timing and control unit 40, for a prescribed time interval (e.g. five seconds), to determine which node's audio is most active, so that each node which is configured to display the video from the 'talking' node (commonly denoted as 'switch-on audio') will have its video display coupled to receive the audio from the node sourcing the most active audio (i.e. which node's teleconference participant is currently speaking).

As described briefly above, operation of the audio combiner unit is governed by the occupancy status of the receive FIFO stores of the active channels of the network. A critical requirement for successful operation of the hub is that each node receive back exactly the same data frequency that it originally transmitted, in order to prevent overrun or underrun of the data. As long as the audio channel is active and there is sufficient audio data stored in one or more buffers to ensure effectively continuous audio transmission, then audio data is processed and forwarded for transmission. If the audio packet input buffers have very little or no audio data, then processing is delayed. More particularly, pursuant to the control mechanism executed by audio combiner unit 30, receiver control unit 95 monitors the EMPTY and HALF-FULL flags of each receive FIFO store 91 and controllably enables the processing of audio data in accordance with the following set of criteria.

First, as long as the receive FIFO store 91 of every active channel contains data, i.e. all EMPTY flags are low, an output enable signal is coupled over each respective channel enable link 145-i to its audio signal processing section 128, causing audio data to be processed (i.e. decoded, D-A converted, combined, A-D converted, and encoded), a byte at a time. A combined data byte is then output, via transmit bus 165 to transmit FIFO store 51, to be asserted onto audio/command pipeline bus 10A during the timeslots specified by the contents of address FIFO store 135. This process continues as long as every receive FIFO store 91 has data to process.

Whenever the receive FIFO store 91 of any active channel becomes empty (i.e. audio data is no longer being received from that channel), it raises its EMPTY flag. In accordance with the audio signal processing mechanism of the present invention, if any receive FIFO store of an active channel becomes empty, the HALF-FULL flags of all channels are examined to determine if any receive FIFO store is at least half-full. Unless there is at least one receive FIFO store that is at least half-full, then processing of data is interrupted. Namely, the audio signal processing section 128 of each channel is inhibited until at least one receive FIFO becomes at least half full or all FIFOs contain data. If at least one channel has an empty receive FIFO store and the receive FIFO store of at least one other channel is at least half-full, then receive control unit enables the channel or channels having the half-full FIFO store to process one byte of audio data.

As will be appreciated from the foregoing description, by means of new and improved hub pipeline architecture and audio signal processing mechanism, the present invention is able to simultaneously interface different nodes of a multiple clock-based video, audio and data exchange network asynchronously, thereby enabling geographically dispersed teleconferencing services to be readily interconnected with one another without any loss of data or misalignment of video and associated audio. Although the hub timing requires an apriori knowledge of the node clocks, it operates asynchronously with respect to each node, so that loss of a node will not shut down the entire network.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What I claim:

1. For use with a communication network in which a plurality of node sites communicate with each other by way of a hub site, wherein a respective node site transmits and receives communication signals at a clock frequency that differs from the clock frequencies at which other node sites of the network transmit and receive communication signals, an apparatus for use at said hub site for enabling said plurality of node sites to simultaneously communicate with each other at their respectively different clock frequencies, via said hub site, comprising:

a time division multiplex communication bus having a first portion which accommodates video data signals and a second portion accommodates portion which accommodates audio data signals;

a plurality of node interface units, each of which is associated with a respective node site and is coupled to receive incoming audio and video communication signals being transmitted from its associated node site at its respective clock frequency and to transmit outgoing audio and video communication signals to its associated node site at its respective clock frequency, and is coupled to said time division multiplex communication bus for interfacing video data signals with the first portion of said time division multiplex communication bus and audio data signals with said second portion of said time division multiplex communication bus; and an audio combining unit having a plurality of audio data processing channels respectively associated with the plurality of node sites of said network, each audio data processing channel being coupled to said second portion of said time division multiplex communication bus and combining audio data signals from node sites other than that with which that channel is associated and forwarding combined audio data signals via the second portion of said time division multiplex communication bus to its associated node interface unit.

2. An apparatus according to claim 1, further including a timing and control unit coupled to said second portion of said time division multiplex communication bus and said audio combining unit for controlling the operation of said audio combining unit.

3. An apparatus according to claim 1, wherein said time division multiplex communication bus operates at a clock rate that is a multiple of the number of node sites in the network times the highest clock frequency of any node sites in the network divided by the bit width of the time division multiplex communication bus.

4. An apparatus according to claim 1, wherein said audio combining unit includes means for controllably combining audio data signals that have been received from plural node sites in dependence upon the quantity of received audio data signals.

5. An apparatus according to claim 4, wherein said audio combining unit includes means for controllably converting audio data signals into analog format, means for combining analog format audio signals from plural node sites and means for converting the combined analog format audio signals into digital format.

6. An apparatus according to claim 1, wherein a respective node interface unit includes at least one video bus interface unit for interfacing video data signals with the first portion of said time division multiplex communication bus, and an audio/command bus interface unit for interfacing audio and command data signals with said second portion of said time division multiplex bus.

7. An apparatus according to claim 6, wherein said at least one video bus interface unit includes an video data input section coupled to receive and store video data received from its associated node site and for controllably effecting, during a timeslot associated with its node site, the placement of stored video data on said first portion of said time division multiplex communication bus and an indication of whether or not video data is available on said first portion of said time division multiplex communication bus.

8. An apparatus according to claim 7, wherein said audio/command bus interface unit includes an audio/command data input section coupled to receive and store audio/command data received from its associated node site and or controllably effecting, during a timeslot associated with its node site, the placement of one of stored audio and command data on said second portion of said time division multiplex communication bus and an indication of whether or not the one of audio and command data is available on said second portion of said time division multiplex communication bus.

9. An apparatus according to claim 8, wherein said audio/command input section includes means for asserting a signal on said second portion of said time division multiplex communication bus representative of whether data placed thereon is audio data or command data.

10. An apparatus according to claim 8, wherein said at least one video bus interface unit includes an video data output section coupled to controllably receive and store video data, that has been placed on said first portion of said time division multiplex communication bus by the video data input section associated with another node sites, and which is to be transmitted its associated node sites.

11. An apparatus according to claim 10, wherein said audio/command bus interface unit includes an audio data output section coupled to controllably receive and store combined audio data that has been placed on said second portion of said time division multiplex communication bus by said audio combiner unit and which is to be transmitted its associated node sites.

12. An apparatus according to claim 5, wherein each processing channel of said audio combining unit includes means for storing audio data signals received from said second portion of said time division multiplex communication bus, and means, coupled to said audio data signals storing means, for controllably converting stored audio data signals into analog format, means for combining analog format audio signals from plural node sites and means for converting the combined analog format audio signals into digital format for placement onto said second portion of said time division multiplex communication bus.

13. An apparatus according to claim 12, wherein said audio combining unit includes means for controllably enabling the means for converting combined analog format audio signals into digital format of a respective channel in accordance with the audio occupancy of the audio data storing means of each channel.

14. An apparatus according to claim 13, wherein each of said audio data storing means includes means for generating a first signal representative of whether or not that storing means contain audio data signals and a second signal representative of whether or not a prescribed percentage of its storage space contains audio data signals, and wherein said controllably combining means controllably enables the means for converting combined analog format audio signals into digital format of a respective channel in accordance with said first and second signals.

15. An apparatus according to claim 14, wherein said controllably combining means controllably enables the means for converting combined analog format audio signals into digital format of a respective channel in response to the first signal of each channel indicating that the audio data storing means of each channel contains audio data signals.

16. An apparatus according to claim 14, wherein said controllably combining means controllably enables the means for converting combined analog format audio signals into digital format of a respective channel in response to the second signal of that channel indicating that at least said prescribed percentage of the storage space of the audio data storing means of that channel contains audio data signals.

17. An apparatus according to claim 16, wherein said controllably combining means controllably disables the means for converting combined analog format audio signals into digital format of a respective channel in response to the first signal of any channel indicating that the audio data storing means of that channel is empty of audio data signals and the second signal of said respective channel indicating that the storage space of the audio data storing means of said respective channel contains less than said prescribed percentage of audio data signals.

18. An apparatus according to claim 14, wherein said prescribed percentage is on the order of fifty percent.

19. For use with a telecommunication network in which a plurality of teleconferencing node sites may simultaneously communicate with each other by way of a hub site, wherein a respective node site transmits and receives telecommunication signals at a clock frequency that differs from the clock frequencies at which other node sites of the network transmit and receive telecommunication signals, an apparatus, located at said hub site, for enabling said plurality of node sites to simultaneously exchange telecommunication signals with each other at their respectively different clock frequencies comprising:

a time division multiplex telecommunication pipeline bus having a video/data file portion which accommodates video and data file signals and an audio/command portion which accommodates audio and command signals;

a plurality of node interface units, each of which is associated with a respective node site and is coupled to receive incoming telecommunication signals being transmitted from its associated node site at its respective clock frequency and to transmit outgoing telecommunication signal to its associated node site at its respective clock frequency, and is coupled to said time division multiplex telecommunication pipeline bus for interfacing video/data file signals with the first portion of said time division multiplex telecommunication pipeline bus and audio/command signals with said second portion of said time division multiplex telecommunication pipeline bus; and an audio combining unit having a plurality of audio signal processing channels respectively associated with the plurality of node sites of said network, each audio signal processing channel being coupled to said second portion of said time division multiplex telecommunication pipeline bus and combining audio signals from node sites other than that with which that channel is associated and forwarding combined audio signals via the second portion of said time division multiplex telecommunication pipeline bus to its associated node interface unit.

20. An apparatus according to claim 19, further including a timing and control unit coupled to said second portion of said time division multiplex telecommunication pipeline bus and said audio combining unit for controlling the operation of said audio combining unit.

21. An apparatus according to claim 19, wherein said time division multiplex telecommunication pipeline bus operates at a clock rate that is a multiple of the number of node sites in the network times the highest clock frequency of any node sites in the network divided by the bit width of the time division multiplex telecommunication pipeline bus.

22. An apparatus according to claim 19, wherein said audio combining unit includes means for controllably combining audio signals that have ben received from plural node sites in dependence upon the quantity of received audio signals.

23. An apparatus according to claim 22, wherein said audio combining unit includes means for controllably converting received audio signals into analog format, means for combining analog format audio signals from plural node sites and means for converting the combined analog format audio signals into digital format.

24. An apparatus according to claim 19, wherein a respective node interface unit includes at least one video/data file bus interface unit for interfacing video/data file signals with the first portion of said time division multiplex telecommunication pipeline bus, and an audio/command bus interface unit for interfacing audio and command signals with said second portion of said time division multiplex telecommunication pipeline bus.

25. An apparatus according to claim 24, wherein said at least one video/data file interface unit includes an video/data file input section coupled to receive and store video/data file signals received from its associated node sites and for controllably effecting, during a timeslot associated with its node sites, the placement of stored video/data file signals on said first portion of said time division multiplex telecommunication pipeline bus and an indication of whether or not video/data file signals are available on said first portion of said time division multiplex telecommunication pipeline bus.

26. An apparatus according to claim 25, wherein said audio/command bus interface unit includes an audio/command signal input section coupled to receive and store audio/command signals received from its associated node sites and or controllably effecting, during a timeslot associated with its node sites, the placement of one of stored audio and command signals on said second portion of said time division multiplex telecommunication pipeline bus and an indication of whether or not the one of audio and command signals is available on said second portion of said time division multiplex telecommunication pipeline bus.

27. An apparatus according to claim 26, wherein said audio/command input section includes means for asserting a signal on said second portion of said time division multiplex telecommunication pipeline bus representative of whether signals placed thereon are audio signals or command signals.

28. An apparatus according to claim 26, wherein said at least one video/data file bus interface unit includes a video/data file output section coupled to controllably receive and store video/data file signals that has been placed on said first portion of said time division multiplex telecommunication pipeline bus by the video/data file input section associated with another node sites, and which is to be transmitted its associated node sites.

29. An apparatus according to claim 28, wherein said audio/command bus interface unit includes an audio/command output section coupled to controllably receive and store combined audio signals that have been placed on said second portion of said time division multiplex telecommunication pipeline bus by said audio combiner unit and which are to be transmitted its associated node sites.

30. An apparatus according to claim 23, wherein each processing channel of said audio combining unit includes means for storing audio signals received from said second portion of said time division multiplex telecommunication pipeline bus, and means, coupled to said audio signals storing means, for controllably converting stored audio signals into analog format, means for combining analog format audio signals from plural nodes and means for converting the combined analog format audio signals into digital format for placement onto said second portion of said time division multiplex telecommunication pipeline bus.

31. An apparatus according to claim 30, wherein said audio combining unit includes means for controllably enabling the means for converting combined analog format audio signals into digital format of a respective channel in accordance with the audio signal occupancy of the audio signal storing means of each channel.

32. An apparatus according to claim 31, wherein each of said audio signal storing means includes means for generating a first signal representative of whether or not that storing means contain audio signals and a second signal representative of whether or not a prescribed percentage of its storage space contains audio signals, and wherein said controllably combining means controllably enables the means for converting combined analog format audio signals into digital format of a respective channel in accordance with said first and second signals.

33. An apparatus according to claim 32, wherein said controllably combining means controllably enables the means for converting combined analog format audio signals into digital format of a respective channel in response to the first signal of each channel indicating that the audio data storing means of each channel contains audio signals.

34. An apparatus according to claim 32, wherein said controllably combining means controllably enables the means for converting combined analog format audio signals into digital format of a respective channel in response to the second signal of that channel indicating that at least said prescribed percentage of the storage space of the audio signal storing means of that channel contains audio signals.

35. An apparatus according to claim 34, wherein said controllably combining means controllably disables the means for converting combined analog format audio signals into digital format of a respective channel in response to the first signal of any channel indicating that the audio signal storing means of that channel is empty of audio signals and the second signal of said respective channel indicating that the storage space of the audio signal storing means of said respective channel contains less than said prescribed percentage of audio signals.

* * * * *